(12) United States Patent
Forbes

(10) Patent No.: US 7,623,550 B2
(45) Date of Patent: Nov. 24, 2009

(54) ADJUSTING CODEC PARAMETERS DURING EMERGENCY CALLS

(75) Inventor: Scott C. Forbes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 600 days.

(21) Appl. No.: 11/365,749

(22) Filed: Mar. 1, 2006

(65) Prior Publication Data

US 2007/0206505 A1 Sep. 6, 2007

(51) Int. Cl.
*H04L 12/56* (2006.01)
*H04J 1/16* (2006.01)

(52) U.S. Cl. .................. 370/477; 370/252; 370/419

(58) Field of Classification Search .......... 370/241, 370/252, 477, 419
See application file for complete search history.

(56) References Cited

U.S. PATENT DOCUMENTS

| | | | |
|---|---|---|---|
| 5,469,471 A * | 11/1995 | Wheatley, III | 370/335 |
| 6,823,303 B1 | 11/2004 | Su et al. | |
| 6,885,731 B2 | 4/2005 | Engelke et al. | |
| 6,970,442 B1 | 11/2005 | Nambirajan | |
| 2001/0010040 A1* | 7/2001 | Hinderks | 704/500 |
| 2004/0032860 A1* | 2/2004 | Mundra et al. | 370/352 |
| 2004/0098251 A1* | 5/2004 | Vainio et al. | 704/201 |
| 2004/0142677 A1 | 7/2004 | Scholz | |
| 2004/0180655 A1 | 9/2004 | Jang et al. | |
| 2004/0203429 A1 | 10/2004 | Anderson et al. | |
| 2005/0063519 A1 | 3/2005 | James | |
| 2005/0071459 A1* | 3/2005 | Costa-Requena et al. | 709/224 |
| 2005/0090225 A1 | 4/2005 | Muehleisen et al. | |
| 2005/0147057 A1* | 7/2005 | LaDue | 370/310 |
| 2006/0256810 A1* | 11/2006 | Yarlagadda et al. | 370/465 |

FOREIGN PATENT DOCUMENTS

| | | |
|---|---|---|
| EP | 0 936 794 | 8/1999 |
| WO | WO 2005/048619 | 5/2005 |

OTHER PUBLICATIONS

CRS Report for Congress, Order Code RL32939, "An Emergency Communications Safety Net: Integrating 911 and Other Services," Sep. 1, 2005.
"An Emergency Communications Safety Net: Integrating 911 and Other Services," 2005.

* cited by examiner

*Primary Examiner*—John Pezzlo
(74) *Attorney, Agent, or Firm*—Perkins Coie LLP

(57) ABSTRACT

The CODEC adjustment system is used when an incoming call is received for emergency services and the received audiovisual data does not reflect the information useful to the emergency services operator. The operator may want to hear background noise or increase the fidelity of the call in order to identify voices or determine the full extent of the emergency. Using the CODEC adjustment system, the operator or the caller can change the parameters of the sending CODEC during the emergency services call such that the encoded data contains the desired information.

19 Claims, 6 Drawing Sheets

ADJUSTING CODEC PARAMETERS DURING EMERGENCY CALLS

BACKGROUND

A CODEC can perform various types of transformations and reverse transformations on audio and visual data. The transformations may include conversion from analog data to digital data, compression of digital data, and other transformations such as higher-order transformations described below. The transformed (or encoded) data is often transmitted from sending devices over networks such as the Internet to receiving devices. The sending devices use the CODEC to transform the data, and the receiving devices use the CODEC to perform the reverse transformations, resulting in output data. CODEC is an overloaded term that can stand for both Coder/Decoder and Compression/Decompression Module. The two definitions come from the usefulness of CODECs for both conversion between analog and digital data and compression and decompression of digital data. Different CODECs are optimized for different situations; for example, some audio CODECs are better for transforming speech, while others are better for transforming music. Likewise, some video CODECs are better for transforming real-time videoconferencing information, while others are better for transforming streaming video.

CODECs often expose a variety of parameters that can be adjusted to customize the transformation for a particular situation. Typical parameters that are exposed by a CODEC include sampling rate, bits per sample, latency, bandwidth, average packet size, lookahead, frame size, average bytes per second, channels, samples per frame, fixed vs. variable rate, block alignment, jitter compensation/control, input and output buffer size, use of error correction, error correction buffer size, bandwidth checking, packet loss checking, and so on. A CODEC generates digital data that is divided into samples, each corresponding to a sampling of the analog input. The sampling rate indicates how often the analog data is to be sampled. A higher sampling rate increases the precision of the transformation and allows capturing more accurate information about higher frequencies. Bits per sample indicates the number of bits that are used to encode each sample. Higher bits per sample results in a higher quality of data, since more information is retained about each sample. Latency indicates the amount of time that data takes to get from the sender device to the receiver. CODECs, Internet gateways, data buffering, and analysis of audio and visual data such as echo cancellation can all cause latency. Too little latency will cause breaks in the encoded data during network congestion, while too much latency will cause a perceived delay, which presents problems when the encoded data needs to be played back in real time (e.g., during a conversation). Bandwidth indicates the amount of data that can be transmitted along a communications channel in a given period of time. Different encoding and compression techniques produce transformed data of various sizes (i.e., higher sampling rates and bits per sample generally require more bytes in the transformed data). The larger the transformed data, the more bandwidth it will consume when it is transmitted.

A CODEC may also perform higher-order transformations on the data to improve the quality or reduce bandwidth of the encoded data and may expose parameters to influence the result of these transformations. These higher-order transformations may be based on Voice Activity Detection (VAD) and Silence Suppression (SS) analyses. A CODEC applies VAD and SS analysis to optimize speech by reducing the amount of encoded data transmitted when no one is speaking. An exposed parameter may be a volume threshold that indicates that data below the threshold is considered noise and is treated as silence, while data above the threshold is considered speech. A CODEC may also perform analysis to detect background noise in order to avoid sending data that is not part of a foreground conversation to improve the quality of the data received and reduce the bandwidth of the transmission. For example, music or a horn blowing in the background of a conversation make it difficult to hear the conversation, so many CODECs perform analysis to identify these types of sounds and transform the data to remove the sounds. The CODEC may perform all of the analysis itself, or other devices may participate to produce the resulting transformed data. For example, systems may contain a separate noise cancellation device, a special microphone, or audio and visual data analysis software that participates with the CODEC to transform the audio and visual data.

The optimization normally performed by a CODEC, such as reducing background noise and compression, is not always well suited for emergency situations. For example, during a 911 call, it may be desirable for the 911 operator to hear what is going on in the background, particularly if the caller is in medical distress and is unable to communicate. During a crime, background information may allow the 911 operator to assess the level of the threat so that appropriate law enforcement units can be dispatched. However, current CODECs are generally optimized to filter out this kind of background information such that it would not be received and heard by the 911 operator.

SUMMARY

A method and system for adjusting CODEC parameters during an emergency services call is provided. The CODEC adjustment system is used when an incoming call is received for emergency services and the received data does not contain all of the information useful to the emergency services operator. Using the CODEC adjustment system, the operator, caller, or an automated network agent can dynamically change the parameters of the sending CODEC during the emergency services call so that the encoded data contains the desired information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
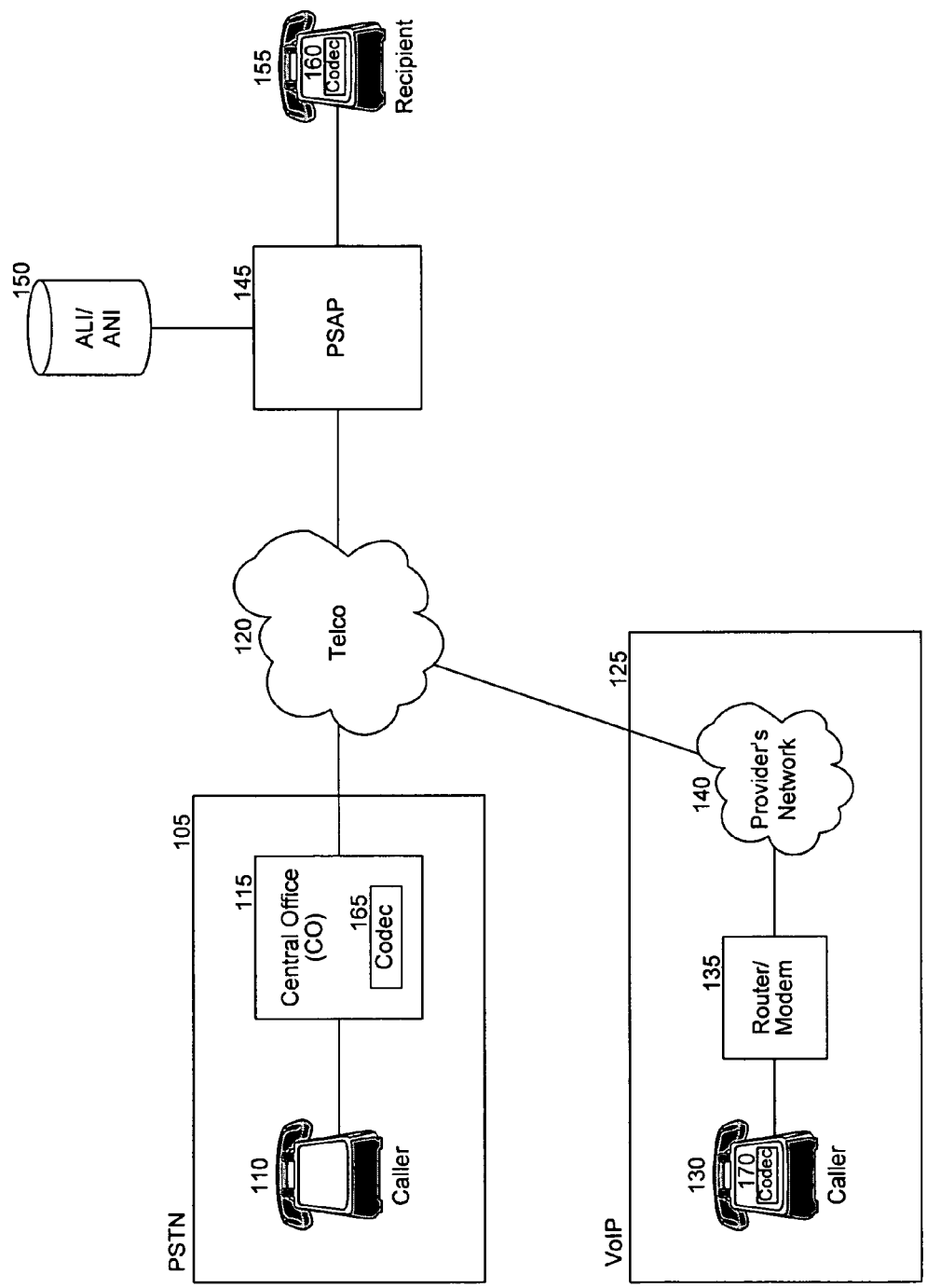
FIG. 1 is a block diagram that illustrates a typical environment in which the CODEC adjustment system operates in one embodiment.

A method and system for adjusting CODEC parameters during an emergency services call is provided. The CODEC adjustment system is used when an incoming call is received for emergency services and the received data does not satisfy the desired criteria for type of information, clarity, or content useful to the emergency services operator. For example, a 911 call encoded using a CODEC that is optimized to reduce background noise and to reduce network bandwidth may not provide all of the information useful to an emergency services operator. The operator may want to hear background noise or to increase fidelity of the call in order to distinguish voices or to determine the full extent of the emergency. Using the CODEC adjustment system, the operator or the caller can change the parameters of the sending CODEC during the emergency services call so that the encoded data contains the desired information. The adjustment system may also be used in non-emergency situations. For example, a person with a hearing aid receiving a call may want to reduce background noise, or a person making a call from a bar may want to reduce the background noise in order to disguise his whereabouts.

In some embodiments, the CODEC adjustment system allows the receiving system to send requests for CODEC adjustments to the sending system. For example, the adjustment system may provide a user interface through which the operator can adjust the parameters of the CODEC of the sending system ("sending CODEC"). The user interface may have a sliding control for increasing or decreasing the bits per sample of the encoded data or for increasing the VAD threshold, or a set of checkboxes for indicating the type of information that the CODEC should include in the encoded data. The operator may also step through a configuration wizard that allows the operator to verbally confirm that a given set of CODEC parameters provide the desired call quality. After receiving the adjustments from the operator, the adjustment system at the receiving system sends an adjustment request to the sending system, which adjusts the parameters of the CODEC accordingly. Alternatively, the receiving system may request adjustments without input from the operator by using a predefined profile or by analyzing the incoming audio data. For example, the receiving system may detect that packets containing encoded data have been dropped due to the sending system exceeding the bandwidth of the communications channel. The receiving system may request that the sending system reduce the bandwidth consumed by the encoded data so that more of the encoded data is received. The adjustment system may also provide a user interface that allows the operator to request higher-level adjustments such as increasing background noise or increasing call quality. The adjustment system at either the receiving system or the sending system can convert these higher-level adjustments into appropriate parameter adjustments such as increasing the VAD threshold or bits per sample used for encoding. The receiving system may also receive confirmation when changes are made.

In some embodiments, the CODEC adjustment system allows the sending system to adjust the parameters of the CODEC. The adjustment system at the sending system may provide a user interface similar to that described above for the emergency services operator. For example, when calling from a construction site, the caller could increase the VAD threshold so that the operator can hear the caller's voice but not the noisy construction activity. After the caller specifies a new value for a parameter, the adjustment system adjusts the parameter of the sending CODEC. The caller may also receive requests from the emergency services operator and adjust the parameters. For example, the adjustment system may notify the caller that the operator is requesting a reduction of background noise, and the caller could then specify appropriate parameters to satisfy the operator's request. The operator could also orally request the caller to make an adjustment. The sending system may also automatically make adjustments based on the actions of the caller. For example, if the caller requests three volume increases in a row, the sending system may make a larger volume adjustment after the last request to help the caller resolve the issue more quickly.

In some embodiments, the CODEC adjustment system receives CODEC adjustments from an intermediate system. For example, in a large office in which calls are routed through a central phone system, an office administrator can provide CODEC parameter profiles to be applied when an emergency services call is detected. For example, a profile may specify a default value for the VAD/SS threshold, bits per sample, sampling rate, and other parameters used by the CODEC. If a person in the office makes an emergency services call, the central phone system sends a request to the sending system to adjust the CODEC parameters to match the default set of parameters defined by the profile.

In some embodiments, the CODEC adjustment system allows both direct and high-level control over CODEC parameters. For example, the caller or operator may have direct control over parameters such as the bits per sample, sampling rate, latency, and VAD/SS threshold. Alternatively, the system may only provide high-level controls to system users, such as a slider for increasing and decreasing background noise or for increasing or decreasing the call quality, which the system then converts to appropriate adjustments to lower-level parameters. Different CODECs may allow different parameters to be adjusted, and the CODEC adjustment system may translate between the user's requested adjustments and the actual adjustments allowed by the CODEC. There system may also present different adjustments to different users. For example, a network operator at an intermediate control station may have access to adjust more parameters than the caller.

In some embodiments, the CODEC adjustment system operates over the public-switched telephone network (PSTN), where the sending system interfaces through a digital device. A 911 call eventually ends up at a public safety answering point (PSAP), regardless of whether the caller initiates a call using an Internet provider, a cell phone, or a normal land line telephone. The PSAP may also be a private call center that is privately operated, but serves the purposes normally served by a PSAP. While many PSAPs are directly connected to a digital network, others remain connected via POTS based on agreements between local governments and telephone companies. In such an environment, the CODEC adjustment system can allow the receiving system to adjust the CODEC parameters of the sender through a variety of mechanisms. For example, an operator at a PSAP may receive the data of the call through the POTS, but may have a separate channel over the Internet established with the caller for managing the call. The adjustment system may also allow an operator to send CODEC parameter adjustments through the POTS phone line such as by Dual Tone Multi-Frequency (DTMF, i.e., touch tone) or other encoding that instructs that sending system to perform CODEC adjustments.

In some embodiments, the CODEC adjustment system operates directly over the Internet or another network. For example, both the sender and recipient of the call may be connected over the Internet using Voice over Internet Protocol (VoIP) or other Internet telephony technologies. The emergency services provider may also be local to the caller, and the two may be connected over a local area network (LAN). For example, a hotel may provide its own security office which is the first recipient of a 911 call placed from a room within the hotel.

In some embodiments, the CODEC adjustment system receives CODEC parameter adjustments before a call is initiated. For example, a caller using a VoIP system may press an emergency button on the handset of their telephone which causes the adjustment system to select a specific CODEC and to set default emergency parameters for the selected CODEC before the call is placed. The adjustment system may also adjust parameters automatically upon detecting that the caller has dialed a certain telephone number (e.g., "911"). The adjustment system may also perform analysis such as determining the amount of background noise in order to set appropriate CODEC parameters before the call is placed.

In some embodiments, the CODEC adjustment system receives CODEC parameter adjustments during call initiation. For example, when the call is set up, the adjustment system at the sender and recipient may use a protocol that allows negotiation of the CODEC parameters at the outset of the call. Protocols such as the Session Initiation Protocol (SIP) and H.323 define methods useful for setting up dialogs between users or devices. SIP also allows different implementations to add extensions which specify parameters that are not part of the base protocol which modify the setup of the dialog. SIP extensions allow the sending system to identify the CODEC as well as the parameters that are adjustable. The receiving system can then specify parameter adjustments during call initiation using additional SIP extensions.

In some embodiments, the CODEC adjustment system receives CODEC parameter adjustments throughout a call. For example, an emergency services operator may want to hear the background noise for a few seconds, but then may want to return to a set of CODEC parameters that allows the caller to be heard more clearly without the background noise. Protocols such as the Real-Time Transport Protocol (RTP) are often used to transmit media used for Internet telephony. RTP provides for extensions that modify the transmission of media. The adjustment system at a receiving system can use these extensions to send adjustment requests to a sending system throughout an emergency services call and to receive acknowledgements of whether the parameters were received and successfully adjusted.

In some embodiments, the CODEC adjustment system switches CODECs based on the CODEC parameter requests. For example, an emergency services operator may request a bits per sample that is not supported by the current sending CODEC. In such a case, the adjustment system may select a more appropriate CODEC based on the chosen set of parameters. The adjustment system may also provide CODECs specifically optimized for a variety of emergency situations. In such a case, the sending or receiving system may need only to select the appropriate CODEC. The adjustment system may also allow for the parameters of such a CODEC to be adjusted. The adjustment system may also reject a parameter adjustment request if, for example, the requested adjustment is not supported by the current CODEC or is not allowed based on a system policy.

In some embodiments, the CODEC adjustment system detects emergency services calls based on the recipient's address. In an emergency call received over the POTS, the phone number receiving the call is sufficient to detect that the call is an emergency call. For example, if the phone number is 911 or is the local police phone number, the call is identified as an emergency services call. For Internet-based calls, the address may be an IP address, a SIP URI, an email address, or other identifying address, and the CODEC adjustment system similarly uses this addressing information to identify the call as an emergency services call. The adjustment system at the receiving system may automatically request adjustments that are appropriate for the recipient's address.

In some embodiments, the CODEC adjustment system records auditing information about CODEC adjustments. It is desirable in many emergency situations, and often required by law, to maintain detailed information about each emergency services call received. Therefore, the adjustment system can record for auditing purposes information about the person requesting CODEC adjustments and the types of adjustments. For example, the adjustment system may store the auditing information in a database maintained by the PSAP, at the sending system, or other location and then upload it to a central location after the completion of the call.

In some embodiments, the CODEC adjustment system keeps a history of CODEC adjustments made in order to improve future emergency services calls. For example, if a 911 operator has repeatedly made the same set of CODEC adjustments during previous emergency services calls, the system may suggest that set of adjustments for a future call or may allow the 911 operator to make the previous adjustments the default for all future calls. The system may also develop profiles for calls from particular destinations. For example, if a particular range of numbers is known to originate from cell phones and the system has a profile of parameters that provide good results for cell phones, the system can apply these parameters when a call is received from a number within the range.

In some embodiments, the CODEC adjustment system identifies calls related to the same incident and applies similar CODEC adjustments to each of the calls. For example, it two callers are determined to be close to the same geographic location where an incident is taking place, and a favorable set of parameters has been found for one of the callers, the system can suggest or apply the same set of parameters to the other caller in order to have a good starting point for getting the appropriate quality from the call.

In some embodiments, the CODEC adjustment system operates over multiple communication channels. For example, encoded data may be received over one channel (such as the POTS) while CODEC parameter adjustment information is sent over another channel (such as the Internet). The caller may provide multiple channels of encoded data to the operator such that the operator can adjust the CODEC parameters of a secondary channel while maintaining the conversation on a primary channel. If the operator finds a set of parameters that is better than those being used on the primary channel, the operator could switch to the secondary channel, and then make further adjustments using the primary channel. Alternatively, a second operator may be using the secondary channel.

FIG. 1 is a block diagram that illustrates a typical environment in which the CODEC adjustment system operates in one embodiment. In a PSTN 105, a caller 110 connects to a central office (CO) 115, which is connected to a telephone company's network 120. The caller 110 typically transmits audio-visual data in analog form to the CO 115, and the CO 115 contains a CODEC 165 for encoding the data and transmitting it to the telephone company's network 120. Similarly, in a VoIP system 125, a caller 130 connects using a VoIP modem 135, which connects using the Internet to the VoIP provider's network 140. The caller 130 in a VoIP system 125 typically has a CODEC 170 present on the caller's system 130, which encodes the data for transmission using the modem 135. The VoIP provider generally has agreements with a local telephone company or private company to use the company's network 120 in order to provide emergency services calls. The telephone company's network 120 connects to a PSAP 145. The PSAP 145 generally uses several databases 150 including an auto location identifier (ALI) database that provides address information about the location that a call is coming from, and an auto number identifier (ANI) that identifies the number that placed the call. The ALI may be maintained by the PSAP, the telephone company, or a third-party. For cellular networks, wireless carriers are working with PSAPs to add GPS triangulation and address information specifying the location of a caller either through a new mechanism or by upgrades to the existing ALI database system. Finally, 911 operators at the PSAP 145 receive the calls at a receiving terminal 155, which generally has a CODEC 160 that matches the one used by the caller in order to decode the received data. The CODEC may also be installed within the telephone company's network or in a separate device. In order to adjust the CODEC 165 or 170 parameters of the caller, the operator at the PSAP 145 may have a user interface that displays adjustments, such as increasing the bit rate, that the operator can make. By manipulating the controls in the user interface, the operator causes a signal to be sent from the operator's terminal 155, through the network 120, to the CODEC 165 or 170 used to encode the caller's data that specifies a CODEC parameter that should be adjusted. The CODEC 165 or 170 then adjusts the requested parameter and begins sending encoded data based on the new parameter.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, a personal area network (PAN), and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
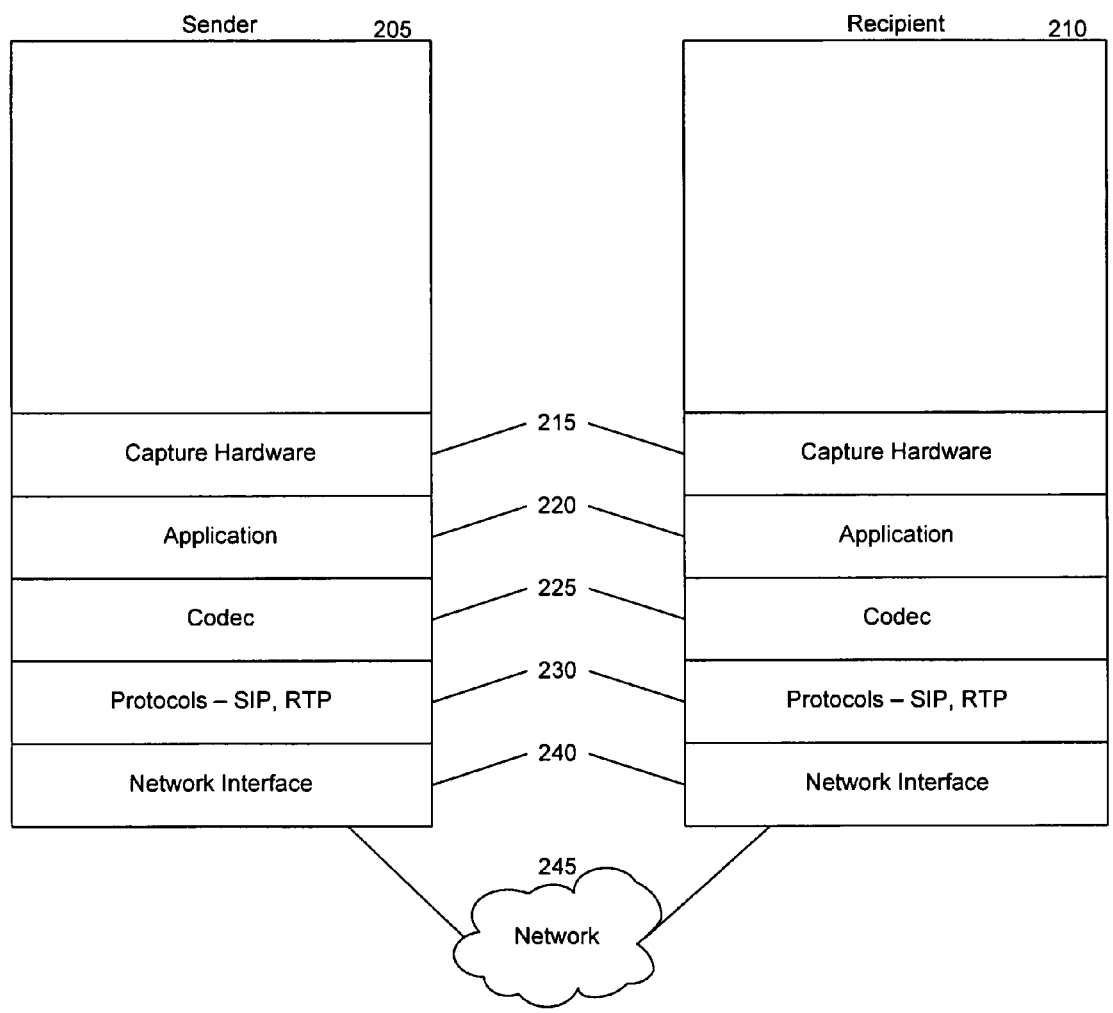
FIG. 2 is a block diagram that illustrates the processing of audiovisual data by the CODEC adjustment system in one embodiment.

FIG. 2 is a block diagram that illustrates the processing of audiovisual data by the CODEC adjustment system in one embodiment. A sender 205 and recipient 210 of an emergency services call often use similar system configurations to process audiovisual data, though each employs the reverse process of the other. Audiovisual data is first captured using hardware 215 such as a microphone and/or camera. The data is then passed to an application 220 which selects and passes the information to a CODEC 225. The CODEC 225 compresses and encodes the captured audiovisual data using a variety of algorithms commonly known in the art. The CODEC 225 then passes the audiovisual data to one or more protocols 230 to prepare the audiovisual data for transmission over a network 245 through a network interface 240. The audiovisual data is received from the network 245 at the recipient system 210 through the network interface 240. The protocol layer 230 retrieves the audiovisual data received and passes it to the CODEC 225 for decompression and decoding. The application 220 receives the decoded audiovisual information and plays it back for the recipient using hardware 215 such as speakers and a monitor.

Figure 3:
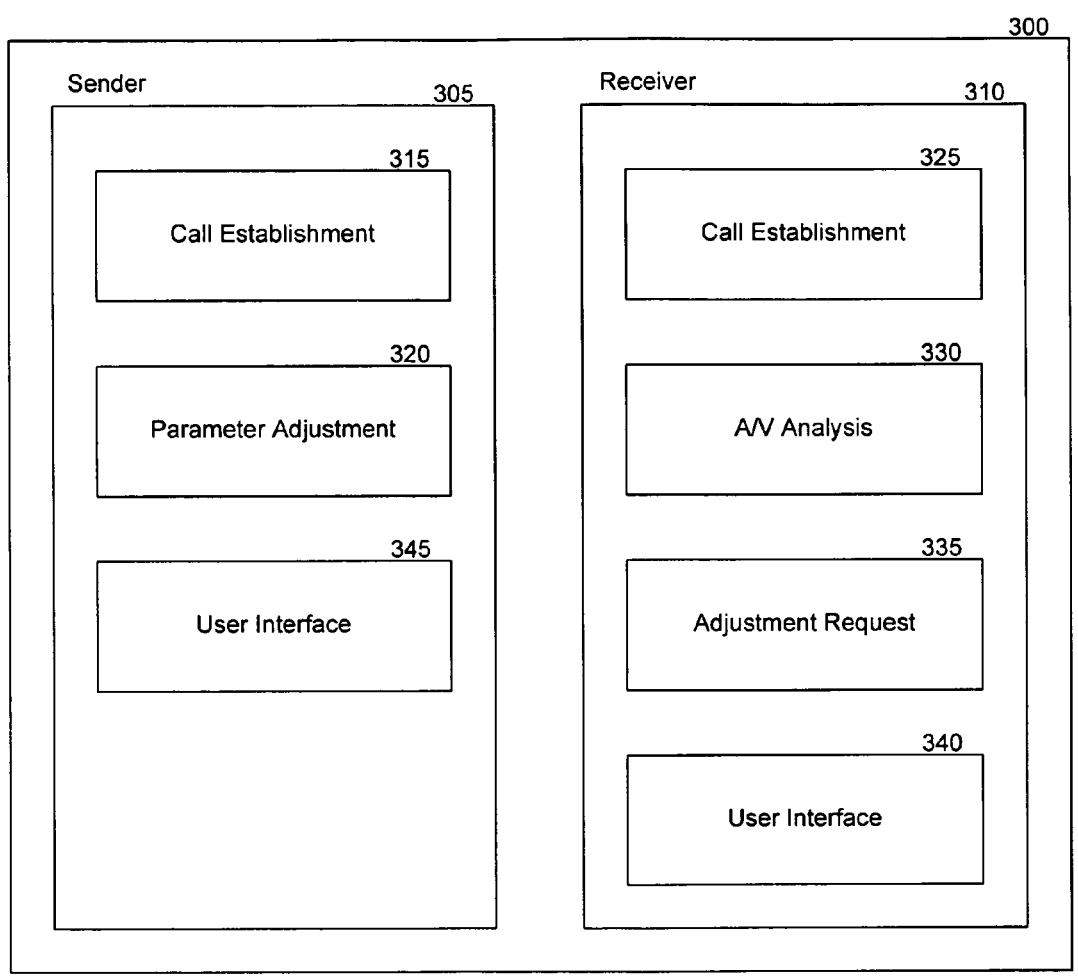
FIG. 3 is a block diagram that illustrates the components of the CODEC adjustment system in one embodiment.

FIG. 3 is a block diagram that illustrates the components of the CODEC adjustment system in one embodiment. The CODEC adjustment system 300 contains a sender component 305 and a receiver component 310. The sender component 305 contains a call establishment component 315 and a CODEC parameter adjustment component 320. The sender component 305 may also contain a user interface component 345 that allows the sender to adjust parameters of the CODEC. The call establishment component 315 handles setting up and tearing down a call, including negotiating an appropriate transmission protocol and sending information about capabilities of the caller's system. The CODEC parameter adjustment component 320 receives notifications from the call recipient or from the caller regarding CODEC parameter changes and makes appropriate adjustments to the parameters provided by the CODEC. The receiver component 310 contains a call establishment component 325, an audiovisual data analysis component 330, and an adjustment request component 335. The receiver component 310 may also contain a user interface component 340 that allows the user receiving the call to adjust the parameters of the CODEC through a graphical interface. The call establishment component 325 operates similarly to the call establishment component 315 of the sender 305. The audiovisual data analysis component 330 analyzes audiovisual data to determine whether the quality of the data meets the desired parameters for the call. The adjustment request component 335 notifies the caller of CODEC parameter change requests generated by the analysis performed by the receiver 310 or based on input received from a user.

Figure 4:
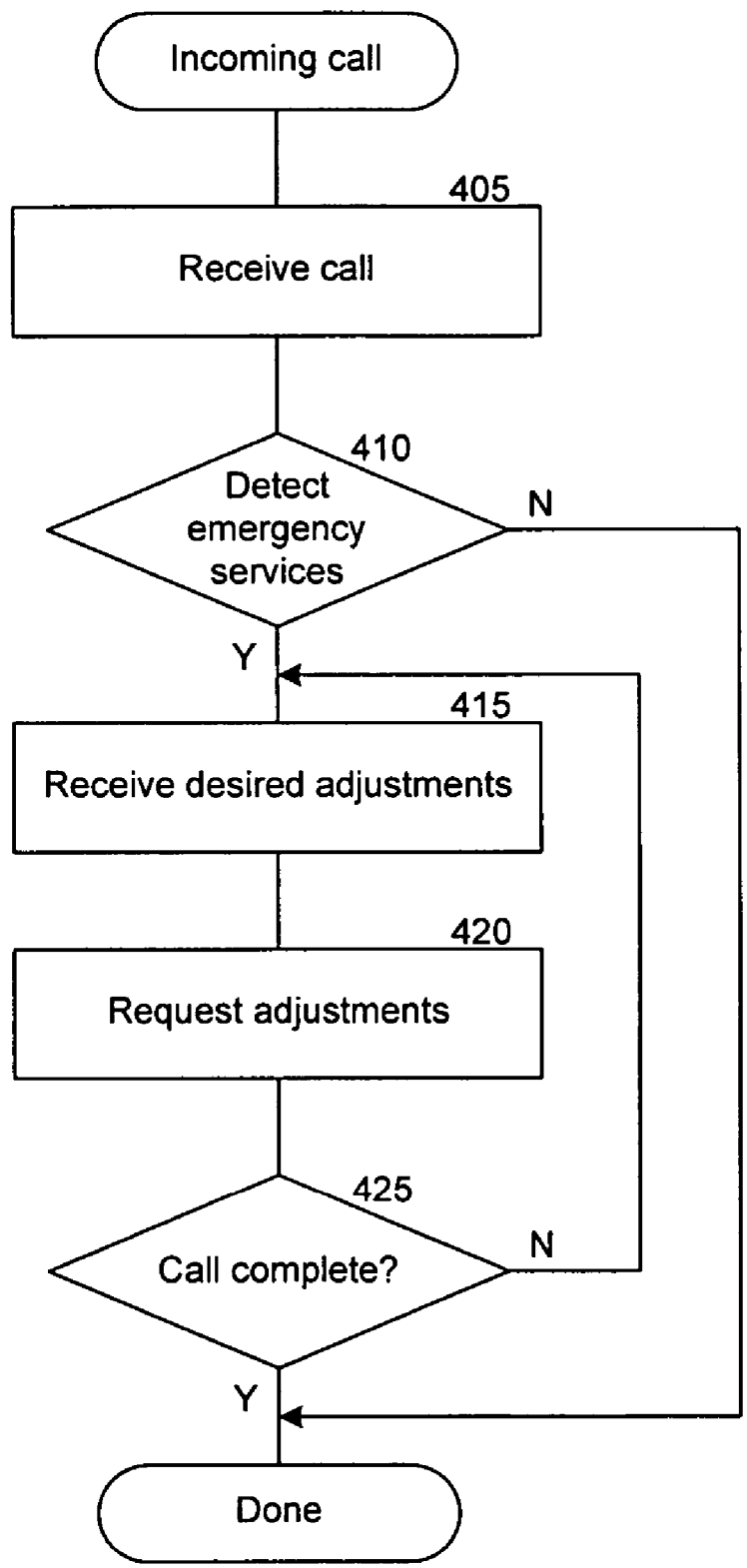
FIG. 4 is a flow diagram that illustrates the processing of the receiver component of the CODEC adjustment system in one embodiment.

FIG. 4 is a flow diagram that illustrates the processing of the receiver component of the CODEC adjustment system in one embodiment. The component is invoked when a call is received. In block 405, the component receives notification of an incoming call. In decision block 410, if the component detects that the call is an emergency services call, then the component continues at block 415, else the component completes. In block 415, the component receives desired adjustments to the audiovisual data received from the sender. The adjustments may come from objective analysis of the audio data performed by the audiovisual data analysis component or from subjective user input. In block 420, the component sends a request to perform the desired adjustments to the sender. In decision block 425, if the call is complete, then the component completes, else the component loops to block 415 to receive additional desired adjustments.

Figure 5:
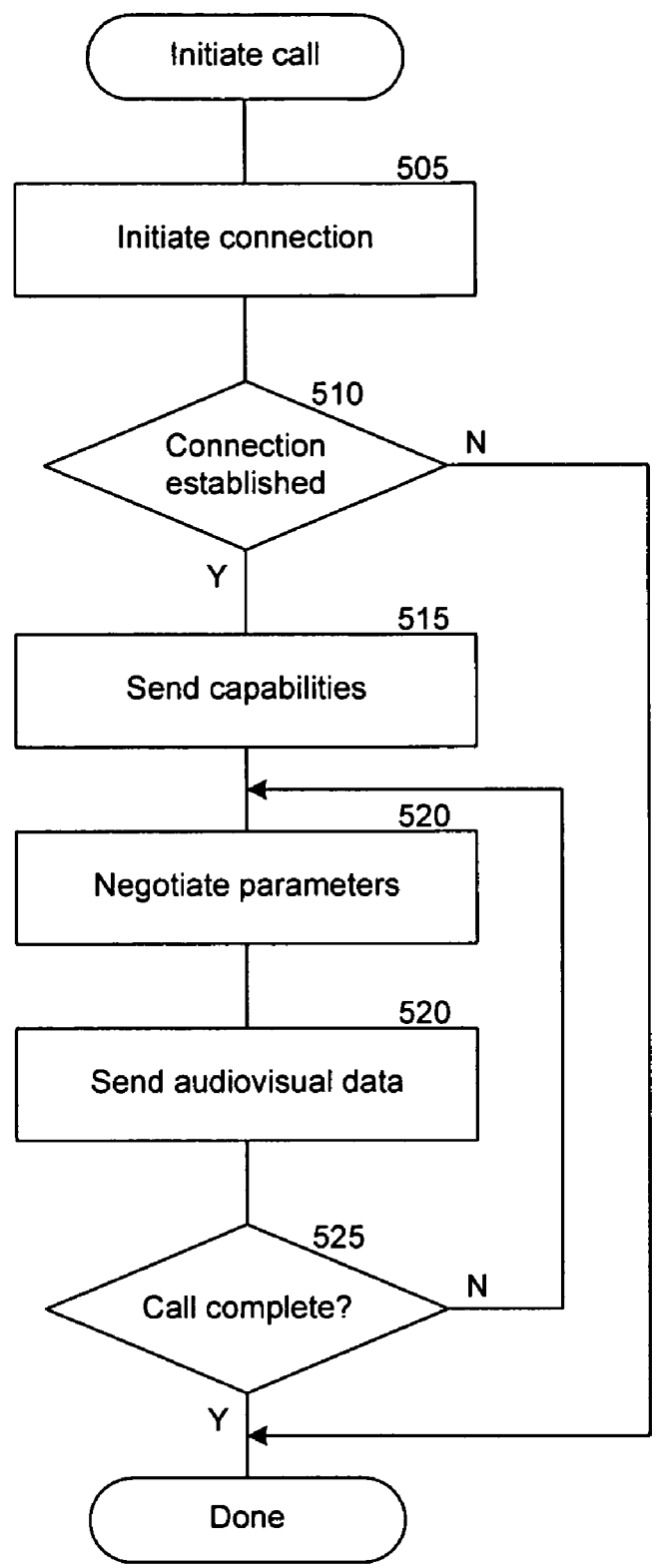
FIG. 5 is a flow diagram that illustrates the processing of the sender component of the CODEC adjustment system in one embodiment.

FIG. 5 is a flow diagram that illustrates the processing of the sender component of the CODEC adjustment system in one embodiment. The component is invoked when a user places an emergency services call. In block 505, the component initiates a connection to a PSAP. In decision block 510, if the connection is established, the component continues to block 515, else the component completes. In block 515, the component sends the capabilities of the CODECs of the sending system to the receiver component. In block 520, the component negotiates an appropriate set of CODEC parameters with the receiver component. In block 525, the component sends audiovisual data using the CODEC to the receiver component. In decision block 530, if the call is complete, the component completes, else the component loops to block 520 to receive additional CODEC parameter adjustments.

Figure 6:
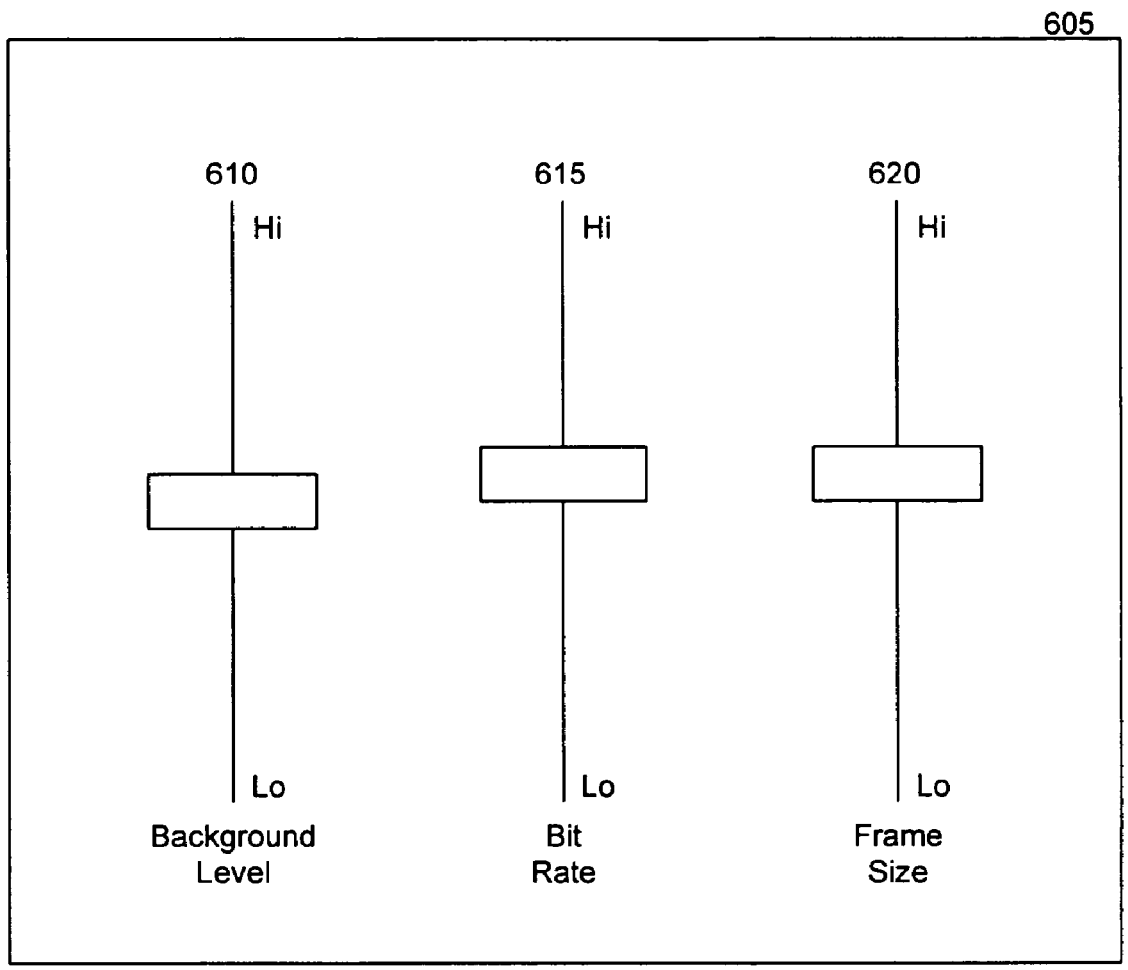
FIG. 6 illustrates a user interface that allows adjusting CODEC parameters in one embodiment.

FIG. 6 illustrates a user interface that allows adjusting CODEC parameters in one embodiment. The user interface 605 contains three slider controls: a background level slider 610, a bit rate slider 615, and a frame size slider 620. By moving the slider controls up and down, an emergency services operator or the caller can alter the encoded data received from the caller to contain additional information not present in the original encoded data. For example, by moving the background level slider 610 up towards "Hi" the operator can increase the amount of background noise contained within the encoded data. Likewise, by moving the bit rate slider 615 and frame size slider 620 up and down, the operator or caller can increase or decrease the bit rate and frame size used by the CODEC to encode the encoded data. The user interface may also contain other types of controls, such as checkboxes for enabling various types of transformations of the audio and visual data.

From the foregoing, it will be appreciated that specific embodiments of the CODEC adjustment system have been described herein for purposes of illustration, but that various modifications may be made without deviating from the spirit and scope of the invention. For example, calls may be sent and received over a variety of mechanisms such as a traditional telephone, a cell phone, or a headset and microphone connected to a personal computer. Phone calls may include either audio or video data or both. While common CODEC adjustments have been described in the context of altering the audio data (such as by increasing background noise), it will be recognized by those of ordinary skill in the art upon reading this description that many additional adjustments are possible. For example, in a video transmission it is possible to adjust the background lighting, or to zoom and pan away from the caller in order to identify background activity. A CODEC is generally software contained within a module, but may also be a software component embedded within a larger application or may even be implemented in hardware. Accordingly, the invention is not limited except as by the appended claims.

I claim:

1. A method in a computer system having a memory and a processor for adjusting CODEC parameters during a call, the method comprising:
   receiving an incoming call for emergency services, the incoming call comprising encoded data, wherein the encoded data is produced by a CODEC having at least one adjustable parameter and wherein the CODEC is configured to filter background noise from the incoming call;
   decoding the encoded data;
   playing the decoded data so that it can be heard by an operator;
   receiving an indication of a determination that the CODEC is filtering too much background noise from the incoming call, the determination having been made by the operator after hearing the played decoded data;
   displaying to the operator a user interface for adjusting the background noise filter of the CODEC;
   receiving from the operator an indication to adjust the background noise filter of the CODEC;
   sending by the processor a request to change a first parameter and a second parameter of the CODEC, the second parameter for adjusting the background noise filter so that the CODEC filters less of the background noise from the incoming call; and
   auditing the requested change by storing an indication of the requested to change the first parameter and the second parameter of the CODEC.

2. The method of claim 1 wherein the request to change the first parameter comprises a request to adjust a parameter selected from the group consisting of sampling rate, bits per sample, latency, bandwidth, average packet size, lookahead, frame size, average bytes per second, channels, samples per frame, fixed vs. variable rate, block alignment, jitter compensation/control, input and output buffer size, use of error correction, error correction buffer size, bandwidth checking, and packet loss checking.

3. The method of claim 1 wherein the request to change the first parameter comprises an adjustment based on historical information from a previous call.

4. The method of claim 1 wherein the request to change a parameter uses an extension to SIP.

5. The method of claim 1 wherein the request to change a parameter uses an extension to RTP.

6. The method of claim 1 wherein the request to change the first parameter is sent when the call is answered.

7. The method of claim 1 wherein the request to change the first parameter is sent dynamically throughout the call.

8. The method of claim 1 wherein the call is received using VoIP.

9. The method of claim 1 wherein the request to change the first parameter is sent automatically based on analysis of the encoded data.

10. The method of claim 1 wherein the request to change the first parameter is in response to receiving an adjustment from an agent listening to the call.

11. The method of claim 1 further comprising storing audit information identifying a source of the request and the parameters that were changed.

12. The method of claim 1 further comprising receiving information identifying the adjustable parameters of the CODEC.

13. A computer-readable storage medium containing instructions to change the quality of data received in a call by adjusting the parameters of a CODEC that encodes the data, by a method comprising:
   during an emergency services call,
      receiving, at a callee's site, call data produced by the CODEC and containing encoded audiovisual information,
      receiving from the callee an indication of a determination that the call data contains less than the amount of information desired by the callee as a result of over-filtering by the CODEC;
      displaying to the callee a user interface for adjusting parameters of the CODEC to adjust the amount of information filtered by the CODEC,
      receiving from the callee an adjustment of at least one parameter of the CODEC to adjust the amount of information filtered by the CODEC, and
      sending from the callee site to a caller site a request to adjust a parameter of the CODEC to adjust the amount of information filtered by the CODEC.

14. The computer-readable storage medium of claim 13 wherein the adjusted parameter increases the background noise contained in the call data.

15. The computer-readable storage medium of claim 13 wherein the call is received using VoIP.

16. The computer-readable storage medium of claim 13 wherein the request to change a parameter is sent automatically based on analysis of the call data.

17. The computer-readable storage medium of claim 13 wherein the request to adjust a parameter is in response to receiving an adjustment from a person listening to the call.

18. The computer-readable storage medium of claim 13 wherein the emergency services call is received on both a first channel and a second channel and wherein the request to change a parameter of the CODEC affects the call data received on the first channel but does not affect the call data received on the second channel.

19. A system for adjusting CODEC parameters during an emergency services call, comprising:

- a call receiving component that receives a call comprising encoded data, wherein the encoded data is produced by a CODEC having adjustable parameters;
- an output component for outputting the received call to a user so that the user can determine whether the CODEC is filtering too much information from the call based on the amount of information contained in the received call relative to an amount of information desired by the user;
- a user interface component that displays a user interface with controls for adjusting a parameter of the CODEC and receives a selection from the user indicating a new value for the parameter based on the user's assessment of the amount of information within the call relative to the amount of information desired by the user; and
- a CODEC adjusting component that adjusts the parameters of a CODEC based on the received selection.

* * * * *

UNITED STATES PATENT AND TRADEMARK OFFICE
CERTIFICATE OF CORRECTION

PATENT NO. : 7,623,550 B2  Page 1 of 1
APPLICATION NO. : 11/365749
DATED : November 24, 2009
INVENTOR(S) : Scott C. Forbes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 868 days.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,623,550 B2  Page 1 of 1
APPLICATION NO. : 11/365749
DATED : November 24, 2009
INVENTOR(S) : Scott C. Forbes It is certified that error appears in the above-identified patent and that said Letters Patent is hereby corrected as shown below:

In column 10, line 7, in Claim 1, delete "requested" and insert -- request --, therefor.

In column 10, line 55, in Claim 13, delete "CODEC;" and insert -- CODEC --, therefor.

Signed and Sealed this
Eighth Day of February, 2011

David J. Kappos
*Director of the United States Patent and Trademark Office*